United States Patent [19]

Franz et al.

[11] Patent Number: 5,221,341
[45] Date of Patent: Jun. 22, 1993

[54] SURFACE-MODIFIED PLATELET-LIKE PIGMENTS

[75] Inventors: Klaus-Dieter Franz, Kelkheim; Johann Dietz, Dietzenbach; Manfred Kieser, Darmstadt, all of Fed. Rep. of Germany

[73] Assignee: Merck Patent Gesellschaft Mit Beschrankter Haftung, Darmstadt, Fed. Rep. of Germany

[21] Appl. No.: 904,636

[22] Filed: Jun. 26, 1992

[30] Foreign Application Priority Data

Jun. 28, 1991 [DE] Fed. Rep. of Germany ....... 4121352

[51] Int. Cl.$^5$ ................................................ C09C 1/02
[52] U.S. Cl. ..................................... 106/449; 106/417; 106/479; 106/456
[58] Field of Search ............... 106/415, 449, 417, 442, 106/444, 456, 479, 482, 486

[56] References Cited

U.S. PATENT DOCUMENTS 3,649,171  3/1972  Fields .............................. 106/449 X Primary Examiner—Karl Group
Assistant Examiner—Chris Gallo
Attorney, Agent, or Firm—Millen, White, Zelano & Branigan

[57] ABSTRACT

The invention relates to surface-modified platelet-like pigments based on platelet-like substrates which are coated with a titanium dioxide layer and a thin alkaline earth metal titanate film on top of it, in which the pigment, in order to increase the photostability and to decrease the surface reactivity towards organic compounds, is ignited at temperatures of at least 800° C.

15 Claims, No Drawings

SURFACE-MODIFIED PLATELET-LIKE PIGMENTS

BACKGROUND OF THE INVENTION

The invention relates to surface-modified platelet-like pigments, i.e., platelet shaped, based on platelet-like substrates which are coated with a titanium dioxide layer and a thin alkaline earth metal titanate film on top of said layer of titanium dioxide.

Platelet-like substrates coated with titanium dioxide, such as, for example, mica platelets are often used for pigmenting plastics, cosmetics or coating compositions, such as, for example, paints or printing inks. However, a disadvantage is the low photostability of titanium dioxide, which, for example, in the case of white pigments, leads to a gradual greying. Upon incorporation of platelet-like substrates coated with titanium dioxide in a polymer matrix, surface reactions between the titanium dioxide surface and the surrounding polymer matrix are observed in many cases, which impair the aesthetic impression of the pigmented polymer. Thus, for example, reaction of the hydroxyl-containing titanium dioxide surface with phenolic stabilizer additives often leads to yellowing of the polymer; however, in addition there may be further impairing surface reactions.

The previous proposals for avoiding these problems frequently do not lead to satisfactory results or are only suitable for solving part of the problem. Thus, for example, silanization of the pigment surface proposed in DE 4,041,663 effectively suppresses surface reactions in many cases, whereas virtually no increase in photostability is observed. The application of further metal oxide layers is, inter alia also unsuitable, since, for example when colored oxide layers are used, such as, for example, iron oxide, the coloristic properties of the pigment underneath which is coated with titanium dioxide are altered completely and moreover the metal oxide layers then deposited on top often also have high surface reactivity.

SUMMARY OF THE INVENTION

An object of the present invention was to describe surface-modified pigments based on platelet-like substrates coated with titanium dioxide which are distinguished by high photostability and by low surface reactivity towards organic compounds.

Upon further study of the specification and appended claims, further objects and advantages of this invention will become apparent to those skilled in the art.

It has been found that these objects can be achieved by providing the pigments according to the invention.

Accordingly, the invention relates to surface-modified pigments based on platelet-like substrates which are coated with a titanium dioxide layer and a thin alkaline earth metal titanate film on top of the $TiO_2$ layer, characterized in that the pigment, in order to increase the photostability and to decrease the surface reactivity towards organic compounds, is ignited at temperatures of at least 800° C.

The invention furthermore relates to a process for the preparation of the pigments according to the invention in formulations, such as paints, polymer materials and cosmetics.

The pigments according to the invention are based on platelet-like (i.e., platelet-shaped) and preferably transparent or semi-transparent substrates composed of, for example, layered silicates, such as mica, talc, kaolin or of glass or other comparable minerals. Preferred platelet-like substrates are mica, talc, kaolin or glass. In addition, metal platelets, such as, for example, aluminum platelets or platelet-like metal oxides, such as, for example, platelet-like iron oxide or bismuth oxychloride are also suitable. Typically, the platelet-like substrates have a thickness between 0.1 and 5 µm and in particular between 0.2 and 4.5 µm. The expansion in the two other dimensions is usually between and 250 µm and in particular between 2 and 200 µm.

To deposit the titanium dioxide, the platelet-like substrate can be dispersed in an aqueous titanyl sulfate solution, and the suspension is then heated, such as is described in DE 1,467,468. In the process described in DE 2,009,566, an aqueous solution of a titanium salt and a base are simultaneously metered into an aqueous suspension of the platelet-like substrates to be coated at a pH suitable for depositing titanium dioxide, while maintaining the pH substantially constant by the addition of a base.

Since the rutile modification of titanium dioxide has a higher refractive index than the anatase modification and mica substrates which are coated, for example, with rutile titanium dioxide have a significantly higher gloss than anatase titanium dioxide mica pigments, the rutile modification is often preferred. A process for depositing titanium dioxide in rutile form on mica is described, for example, in DE 2,214,545. The processes for coating the substrate with titanium dioxide mentioned here are merely given by way of example and are intended merely to illustrate the invention. However, it is also possible to use other processes not mentioned here explicitly. After being coated with titanium dioxide, the substrates are usually separated off, washed and, if desired, dried or ignited.

The platelet-like substrates can initially be covered with one or more other metal oxide layers consisting of, for example, chromium oxide, iron oxide, zirconium oxide, alumina, tin oxide and/or further metal oxides, before the titanium dioxide layer is applied. Processes for depositing other metal oxides are described, for example, in DE 1,959,998, DE 2,215,191, DE 2,244,298, DE 2,313,331, DE 2,522,572, DE 3,137,808, DE 3,151,343, DE 3,151,354, DE 3,151,355, DE 3,211,602 or DE 3,235,017. Pigments according to the invention which do not contain more than 2 and in particular only one or no further metal oxide layer underneath the titanium dioxide layer are particularly preferred.

To produce the alkaline earth metal titanate film, a water-soluble alkaline earth metal salt (or a mixture of water-soluble alkaline earth metal salts), a water-soluble diol compound and a water-soluble titanium salt are added to an aqueous suspension of the platelet-like substrates coated with titanium dioxide. Instead of water or aqueous, i.e., water-containing, solvents, it is in some cases also possible to use lower alcohols, such as, for example, methanol, ethanol, propanol or iso-butanol as solvent; solvents of this type are summarized in the context of the present application by the name aqueous solvents.

Suitable alkaline earth metal salts include alkaline earth metal chlorides, furthermore also alkaline earth metal nitrates and other water-soluble compounds. A preferred alkaline earth metal salt is calcium chloride. All alkaline earth metals, i.e., elements of Group IIA of the periodic table may be used. The titanium salts used are usually titanium(IV) chloride, titanylsulfate, titanyl nitrate or also other titanium salts soluble in aqueous solutions. Preferred titanium salts are titanium tetrachloride and titanyl sulfate.

The designation water-soluble diol compounds is understood to mean shorter-chain aliphatic diols preferably having not more than 5 carbon atoms, furthermore also aromatic diols in which the two OH groups are separated from one another by not more than one $CH_2$ group, and in particular also $H_2O_2$. Particularly suitable diols are ethylene glycol, propylene glycol, butane-1,2-diol, glycolic acid, lactic acid, oxalic acid, malonic acid, furthermore pyrochatecol and resorcinol and in particular $H_2O_2$. Preferred "diols" are hydrogen peroxide, pyrocatechol and oxalic acid. Hydrogen peroxide, dicarboxylic acids and diphenols are included under the general term "diols" because compounds with two hydroxyl groups are needed for the formation of a titanium complex as described in G. Pfaff, Z. Chem., 28 (1988) 76 and Z. Chem. 29, (1989) 395. The simplest compound with two hydroxyl groups is hydrogen peroxide.

The temperature of the reaction solution is not very critical and is usually between 20° and 80° C. and in particular between 20° and 60° C.

The deposition reaction is typically carried out at a pH of between 6 and 12 and in particular at a $pH \geq 7$.

The reaction is carried out by usually adding an aqueous solution of the diol and the alkaline earth metal salt or salts to an aqueous suspension of the platelet-like substrate coated with titanium dioxide. An aqueous solution of the titanium salt is then slowly added dropwise, during which the pH is advantageously kept constant by adding a base.

The titanium salt and the alkaline earth metal salt or salts are preferably added in substantially equimolar amounts. However, in some cases it has proven advantageous to add the alkaline earth metal salt in excess or in a less than stoichiometric amount, the relative ratio of alkaline earth metal salt to titanium salt being preferably between 0.8 and 1.2 and in particular between 0.95 and 1.05. The amount of diol, relative to the amounts of titanium salt or alkaline earth metal salt or alkaline earth metal salts, is preferably twice the molar amount, deviations from the stoichiometric amounts being possible in this case too. The relative amounts given are merely intended to illustrate the invention without limiting it.

When an alkaline earth metal chloride, titanium chloride and oxalic acid are used, the following equation results, which, however, is only to be understood as an example and merely intended to illustrate the invention without limiting it (G. Pfaff, Z. Chem., 30 (1990) 379):

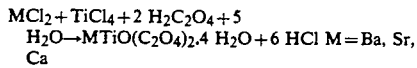

The precipitation of titanium complexes of this type is known per se and described, for example, in G. Pfaff, Z. Chem., 28 (1988) 76 and Z. Chem., 29 (1989) 395. In the precipitated complex, the titanyl ion is surrounded by 2 oxalate ions and 4 water molecules, while in the case of $H_2O_2$ a complex of the composition $MTiO_2(O_2)$ (G. Pfaff, Z. Chem., 28 (1988), 76) was found. The particular suitability of the abovementioned diols for the process according to the invention is probably due to the fact that these small or relatively small diol molecules enable these complexes to be formed and do not hinder sterically.

Precipitation of a calcium titanyl oxalate complex onto a mica substrate coated with titanium dioxide has first been described in DE 3,824,809 (see Example 14). However, there the coated substrate was separated off and ignited in a reducing gas stream, which results in the formation of an oxide bronze layer.

In contrast, in the present invention, the coated substrate, after being separated off, washed and, if desired, dried, is ignited at temperatures of at least 800° C. At these high temperatures, the precipitated complex is decomposed with the formation of an alkaline earth metal titanate present in perovskite structure, i.e., crystalline calcium titanate. The ignition temperature is particularly preferably at least 850° C. and in particular at least 900° C. The maximum ignition temperature is preferably 1,200° C. and in particular not more than 1,000° C.

The ignition step is conducted at about 6 to 3 hours, preferably in about 30 min. in a non-reducing atmosphere, e.g., air or oxygen. The heat source is a rotary kiln or muffle furnace.

Since the calcination of the pigment is carried out in a non-reducing atmosphere, titanium remains in the highest oxidation number and no oxide bronzes can be formed. During the calcination, calcium penetrates from the calcium titanate layer into the titanium dioxide layer. At this time, the oxidation number of the titanium does not change. The organic titanium complex, $MTiO(C_2O_4)_2$, is converted into alkaline earth metal titanate, $MTiO_3$.

It has been found that platelet-like substrates coated with titanium dioxide and containing a surface film of this type composed of a stoichiometric alkaline earth metal titanate have significantly higher photostability and significantly lower surface reactivity towards organic compounds and in particular towards those containing hydroxyl groups than the substrates coated with titanium dioxide.

The precipitation reaction is preferably carried out in such a manner that after ignition a relatively thin alkaline earth metal titanate film of less than 40 nm is obtained, since the optical properties of the platelet-like substrate coated with titanium dioxide is not or only insignificantly affected by such a thin surface film, which is desirable in many cases. However, it is also possible to use thicker alkaline earth metal titanate films of more than 40 nm, in order to obtain special optical effects; the maximum preferred film thickness is about 400 nm, film thicknesses of not more than 250 nm being generally more preferred. The weight proportion of the alkaline earth metal titanate film, relative to the pigment according to the invention, is preferably between 0.1 and 20 percent by weight and in particular between 0.2 and 10 percent by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 41 21 352.1, filed Jun. 28, 1991, are hereby incorporated by reference.

EXAMPLE 100 g of Iriodin 199 ® (commercial product from E. Merck, Darmstadt) are suspended in fully deionized water. The suspension is brought to a pH of 9 by adding a 10% aqueous NaOH solution. 50 ml of an aqueous solution of $CaCl_2$ and $H_2O_2$ (7.2 g of $CaCl_2 \times 2\ H_2O$ and 6 ml of a 30% $H_2O_2$ solution made up to a volume of 50 ml with water) are metered in at 75° C. over a period of 30 minutes, during which the pH is kept substantially constant.

The reaction product is filtered off, dried and ignited at 900° C. This gives a white nacreous pigment, which is stabilized against yellowing.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A surface-modified platelet-shaped pigment comprising a platelet-shaped substrate coated with a titanium dioxide layer and top layer of an alkaline earth metal titanate film prepared by a process comprising adding a water-soluble alkaline earth metal salt and a water-soluble diol to an aqueous suspension of a platelet-shaped substrate coated with titanium dioxide, depositing an alkaline earth metal titanium oxo or peroxo complex on top of said layer and igniting the pigment at a temperature of at least about 800° C., whereby the resultant pigment has high photostability and low surface reactivity towards organic compounds.

2. A process for the preparation of a surface-modified pigment, comprising: (a) adding a water-soluble titanium salt, at least one water-soluble alkaline earth metal salt and a water-soluble 1,2-diol compound to an aqueous suspension of a platelet-shaped substrate coated with titanium dioxide under conditions leading to the deposition on the substrate of an alkaline earth metal titanium oxo or peroxo complex and (b) igniting the resultant pigment at a temperature of at least about 800° C.

3. A pigment produced by the process of claim 2.

4. A process according to claim 2, wherein the ignition step is conducted for about 3 to 6 hours in a non-reducing atmosphere.

5. A process according to claim 4, wherein the ignition step is conducted in air or oxygen.

6. A surface-modified platelet-shaped pigment according to claim wherein the thickness of the platelet-like pigment is 2 to 200 μm.

7. A surface-modified platelet-shaped pigment according to claim 1, wherein the platelet-like pigment is a layered silicate, metal platelet or platelet-shaped metal oxides.

8. A surface-modified platelet-shaped pigment according to claim 6, wherein the platelet-shaped pigment is an aluminum platelet, mica, kaolin, glass, platelet-shaped iron oxide or bismuth oxychloride.

9. A surface-modified platelet-shaped pigment according to claim 1, wherein the alkaline earth metal titanate film is less than 40 nm after ignition.

10. A process according to claim 2, wherein the deposition is conducted at $pH \geq 7$.

11. A surface-modified platelet-shaped pigment according to claim 1, wherein the substrate is coated with at least one additional metal oxide layer before coating by the titanium dioxide layer.

12. A surface-modified platelet-shaped pigment according to claim 11, wherein the additional metal oxide layer is chromium oxide, iron oxide, zirconium oxide, alumina or tin oxide.

13. A surface-modified platelet-shaped pigment according to claim 1, wherein the ignition is conducted in a non-reducing atmosphere.

14. In a paint, plastic or cosmetic comprising a platelet-shaped pigment, the improvement wherein the pigment is one of claim 1.

15. In a paint, plastic or cosmetic comprising a platelet-shaped pigment, the improvement wherein the pigment is one produced by claim 2.

* * * * *